June 5, 1962
A. H. YOUMANS
3,038,075
METHODS AND MEANS FOR COMPENSATION OF
DENSITY LOGGING INSTRUMENTS
Filed June 21, 1956
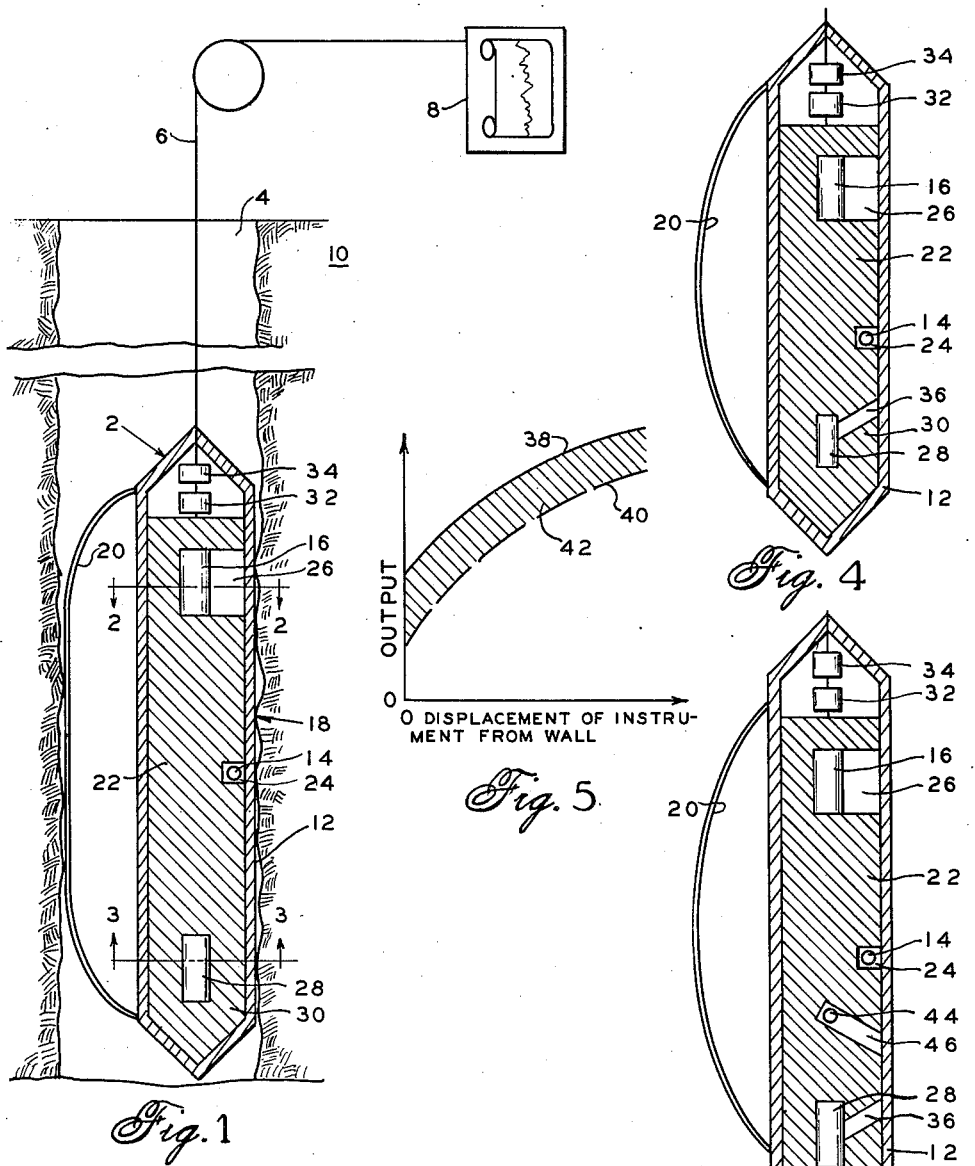
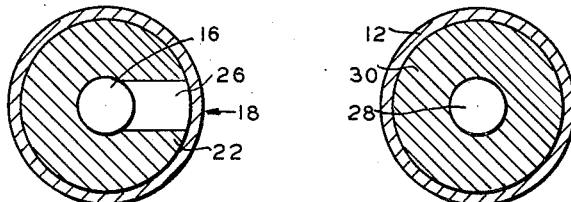
INVENTOR.
ARTHUR H. YOUMANS
BY
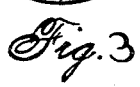
ATTORNEY United States Patent Office 3,038,075
Patented June 5, 1962

3,038,075
METHODS AND MEANS FOR COMPENSATION OF DENSITY LOGGING INSTRUMENTS
Arthur H. Youmans, Tulsa, Okla., assignor to Well Surveys, Incorporated, a corporation of Delaware
Filed June 21, 1956, Ser. No. 592,912
10 Claims. (Cl. 250—83.3)

This invention relates to radioactivity well logging and particularly to methods and means for compensating for extraneous effects in density logging.

In the art of density logging, it has been found that, if rock formations are irradiated with gamma rays, the gamma rays are scattered much more readily by dense rock than by porous rock. Accordingly, by suspending an instrument containing a gamma ray source and a detector in a well and raising the instrument slowly, a log of the well can be made showing the density of the formations at the various depths throughout the well. Obviously, oil, water and other fluids will be found in the less dense, more porous formations.

Unfortunately, there are many factors which influence the measurements in density logging. The diameter of the well, the density of the drilling mud, the presence and type of fluids in the well and the displacement of the instrument from the wall of the well are among the factors and, unless information concerning each of these factors is known, the log may be of little or no value. The effects of these factors are referred to collectively as "borehole effect." It is difficult and costly to obtain information concerning "borehole effect" separately. Therefore, the general practice is to attempt to reduce the borehole effect by providing means for holding the instrument against the wall of the well and shielding the side of the instrument which is away from the wall with lead or similar material which is relatively opaque to gamma rays. However, this still does not completely eliminate the effect; consequently skilled technicians are required to interpret the logs, and sometimes proper interpretation is impossible.

These disadvantages of prior art density logging devices are overcome with the present invention. Methods and means are provided which compensate for the various factors and substantially eliminate borehole effect from the log. Consequently, it is possible to obtain density logs of higher quality which have much greater detail than previous logs and which are capable of more precise interpretation even by the less highly skilled.

The advantages of the present invention are preferably attained by providing a novel subsurface instrument having two detectors, one of which is employed in a conventional manner while the second is arranged and adapted to measure the borehole effect. The output of the second detector is then subtracted from the output of the first, thereby cancelling the borehole effect and leaving only that part of the signal from the first detector which is truly representative of the density characteristics of the formations surrounding the well.

Accordingly, it is an object of the present invention to provide novel methods of density logging which provide higher quality logs having greater detail.

Another object of the present invention is to provide novel means for density logging which substantially eliminate borehole effect.

A further object of the present invention is to provide novel means for producing density logs which are more truly representative of the density characteristics of the surrounding formations and which may easily be interpreted.

A specific object of the present invention is to provide a novel subsurface instrument for density logging having one detector which provides a density log in a conventional manner, a second detector arranged and adapted to measure the results of the borehole effect, and means for subtracting the output of the second detector from the output of the first detector so as to substantially cancel borehole effect and leave only that portion of the output of the first detector which truly represents the density characteristics of the formations surrounding the well.

These and other objects and features of the present invention will be apparent from the following description wherein reference is made to the figures of the accompanying drawings.

In the drawings:

FIGURE 1 is a view partly in section showing a typical well logging instrument embodying the present invention suspended in a well;

FIGURE 2 is a cross-sectional view of the instrument of FIGURE 1 taken on the line 2—2 thereof;

FIGURE 3 is an additional cross-sectional view of the instrument of FIGURE 1 taken on the line 3—3 thereof;

FIGURE 4 is a sectional view of a subsurface well logging instrument showing a modified form of the invention;

FIGURE 5 is a graph showing the relationship of output vs. displacement for the device of FIGURE 4; and FIGURE 6 is a sectional view of a subsurface well logging instrument showing a further modified form of the invention.

In those forms of the invention chosen for purposes of illustration in the drawings, FIG. 1 shows a subsurface well logging instrument 2 suspended in a well 4 by means of a cable 6. The cable 6 also serves to transmit signals from the subsurface instrument to a recorder 8, located at the surface of the earth, which plots the signals from the instrument 2 in correlation with depth to provide a continuous log of the density of the formations 10 surrounding the well 4.

The instrument 2 has a housing 12 of steel or the like to protect the various components from damage by pressure or by banging against the wall of the well. Within the housing 12 is a gamma ray source 14, and a gamma ray detector 16. To minimize borehole effect, the source 14 is preferably mounted adjacent one side or face 18 of the instrument 2 and a resilient skid 20 is arranged diametrically opposite the source 14 to bear against the wall of the well and urge the face 18 of the instrument into intimate contact with the wall on the opposite side of the well.

Shielding 22 of lead or other material which is relatively opaque to gamma rays is provided about the sides and back of the detector, as seen in FIGURE 2. However, windows 24 and 26 are provided adjacent the source 14 and detector 16 respectively on the side closest to face 18 to facilitate passage of gamma rays from the source 14 into the formations 10 and from the formations to detector 16 while the shielding 22 restricts passage of gamma rays in other directions. The windows 24 and 26 may merely be openings in the shielding 22 or may be formed of water, magnesium or other suitable material which is relatively transparent to gamma rays.

The shielding 22 limits the number of gamma rays which can pass into the well to cause borehole effect. However, since the diameter of the instrument is limited by the diameter of the well, the amount of shielding which can be provided is similarly limited and there will always be some gamma rays which penetrate the shielding to cause borehole effect. As pointed out above, the various factors which contribute to the borehole effect tend to confuse or mask the information obtained so that highly skilled technicians are required to interpret the log, and sometimes even they cannot give a reliable interpretation. In order to overcome this and to eliminate the borehole effect completely, an auxiliary detector 28 is provided. The auxiliary detector 28 is preferably identical to detector 16 and is spaced the same distance from the source 14 as detector 16. As seen in FIGURE 3, detector 28 may be provided on all sides with shielding 30 corresponding to the shielding 22 of detector 16 and, as illustrated in FIG. 1, the shielding 30 may be integral with shielding 22. In this way, the radiation reaching detector 28 will be exactly equal to the radiation which travels through the borehole and enters detector 16 through the shielding 22. The signals from detectors 16 and 28 may be processed in any suitable manner, as by processing circuit 32. The circuit 32 may include conventional counting rate meters or integrating units where the detectors are of the pulse type. This circuit is necessary to prepare the signals for combination. The signals must be normalized before subtraction. That is a change in borehole effect must result in equal changes in the two signals being combined. Further, the signals must be in a form that permits combination, as two D.C. signals or two A.C. signals of the same frequency and the same or opposite phase. Thereafter, by differentially combining the output of detector 28 with the output of detector 16, a log can be made which is not effected by variations in the diameter of the borehole and the density of the well fluids. Consequently, the log will be much more truly representative of the density characteristics of the formations. This differential combination may be accomplished within the subsurface instrument, as by combining circuit 34, or the signals may be transmitted separately to the surface and subsequently combined. Moreover, if desired, the output signals from detectors 16 and 28 may be traced by recording device 8 in addition to the combined signal.

Unfortunately, the apparatus of FIGURE 1 is still affected by displacement of the instrument from the wall of the well. Unless the instrument 2 is actually in contact with the wall of the well, a source of error is still present. However, this can be eliminated, as illustrated in FIGURE 4, by providing a relatively small window 36 adjacent detector 28 of the same material and on the same side of the instrument as the windows 24 and 26 and by making the spacing between detector 28 and the source 14 less than that between detector 16 and source 14. This allows detector 28 to respond to changes in instrument position in the same way that detector 16 does while simultaneously responding to borehole diameter and density of the well fluids. Preferably, the window 36 is inclined upwardly, as seen in FIGURE 4, so as to reduce the likelihood of gamma rays from the formations passing therethrough but to facilitate passage of gamma rays scattered within the well when the instrument is displaced from the wall of the well.

It has been found in practice that, as the distance between a detector and the source is reduced, the relative response of the detector to gamma rays penetrating the formations decreases whereas the relative response to borehole effect increases. Obviously, the spacing of detector 16 should be relatively long so that it will have high response to gamma rays which penetrate the formations 10 but poor response to borehole effect. However, the spacing should not be longer than is consistent with the requirement that a sufficiently high counting rate be obtained to give a measurement of good statistical accuracy. When the optimum position for detector 16 has been determined, a series of measurements may be made at a given depth in the well with the instrument at different distances of displacement from the wall of the well and a curve may be plotted showing the output in relation to displacement of the instrument from the wall. This curve is illustrated by the solid line curve 38 shown in FIGURE 5. The position of detector 28 is made such that its response bears a known relationship to the response of detector 16, but detector 28 is placed somewhat closer to the source 14 so that it will be more responsive to gamma rays within the well, i.e., borehole effect. Care must be taken in determining the position of detector 28 to prevent its being so close to source 14 that gamma rays pass directly from source 14 to detector 28 through the intermediate shielding. A curve showing output vs. displacement may then be made for detector 28.

This curve may initially vary considerably from curve 38. However, by adjustment of the size, shape and arrangement of the window 36 and the size and sensitivity of detector 28, or the counting rate meters of unit 32, the slope of the curve is made to correspond to curve 38, as indicated by dashed line 40 of FIGURE 5. When this has been done, it will be found that the two curves 38 and 40 are vertically spaced apart a constant distance, as shown by shaded portion 42, which represents that portion of the response of detector 16 which is due solely to the gamma rays which penetrate the formations. With this arrangement, differential combination of the outputs of detector 28 and detector 16 will result in a wholly corrected log which is completely free of the borehole effect and accurately shows the density of the formations surrounding the well. Thus, virtually anyone, regardless of training, can make an intelligent interpretation of the log.

If desired, additional parameters may be introduced, as seen in FIGURE 6, to further improve the precision with which a corrected log can be made. This form of the invention is similar to that of FIGURE 4 but has an auxiliary gamma ray source 44, of less intensity than source 14, placed between detector 28 and the principal gamma ray source 14. A collimating window 46 is provided which directs the gamma rays from source 44 angularly downward so as to prevent these gamma rays from reaching detector 16. The window 46 is formed on the same side of the instrument 2 as windows 24, 26 and 34. With this arrangement, detectors 16 and 28 may be identical and the source to detector spacings for these detectors may also be identical. Thus, the only differences in the reading of the two detectors will be due to gamma rays entering detector 16 through window 26 from the formations. When the instrument 2 is in contact with the wall of the well, the gamma rays from source 44 will be scattered by the formations and those returning to the well will have insufficient strength to pass through the shielding about detector 28 and the inclination of window 36 will prevent more than a negligible amount of gamma rays from reaching detector 28. However, if the instrument is moved away from the wall of the well, the gamma rays from source 44 will pass through the less dense well fluid and will be at a proper angle to pass through window 36 to reach detector 28. With this arrangement, it is possible to make detector 28 correct the output of the instrument 2 for the borehole effect and instrument to wall separation with extreme accuracy by adjusting the strength and position of source 44 and the size, shape and location of windows 36 and 46.

It should be noted that the invention does not require detectors 16 and 28 to be located on opposite sides of the source 14. On the contrary, it may be desirable to place detector 28 between detector 16 and source 14. With such an arrangement, the size and position of the window 34 may still be determined so that detector 28 will correct for extraneous effects in the output of the instrument. Obviously, numerous other alterations and modifications may also be made without departing from the invention. Accordingly, it should be clearly understood that those forms of the invention described above and shown in the figures of the accompanying drawings are illustrative only and are not intended to limit the scope of the invention. It is understood that the apparatus includes necessary conventional components such as conductors, amplifiers and power supplies.

What I claim is:

1. Apparatus for measuring the density of formations surrounding a well including a subsurface instrument, a recording device, and a cable suspending said instrument in said well and having conductor means for transmitting signals from said instrument to said recording device, said instrument comprising a housing, gamma ray source means located within said housing for irradiating the formations surrounding the well with gamma rays, a first gamma ray detector spaced a fixed distance from said source means, a second gamma ray detector spaced a fixed distance from said source means, a gamma ray shield substantially surrounding said source and said detectors and formed of material which is relatively opaque to gamma rays, a first window formed in said shield adjacent said source, a second window formed in said shield adjacent said first detector, said windows being formed of matter which is relatively transparent to gamma rays whereby said first detector is more sensitive to gamma radiations scattered by said formations than said second detector, and means for differentially combining the outputs of said first and second detectors in the sense that changes in the respective outputs occasioned by a given change in the density of the surrounding material are differentially combined as scalar quantities.

2. Apparatus for measuring the density of formations surrounding a well comprising a subsurface instrument, means in said instrument for irradiating said formations with gamma rays, a first detector spaced a fixed distance from said irradiating means preferentially measuring gamma rays scatered by said formations, a second gamma ray detector spaced a fixed distance from said irradiating means preferentially measuring borehole effect, and means for differentially combining the outputs of said first and second detectors in the sense that the combined output contains a differential borehole effect component.

3. Apparatus for measuring the density of formations surrounding a well including a subsurface instrument, a recording device, and a cable suspending said instrument in the well and having conductor means for transmitting signals from said instrument to said recording device, said instrument comprising a housing, means for urging one side of said housing into contact with the wall of said well, a source of gamma rays located within said housing for irradiating said formations, a first detector spaced a fixed distance from said source for measuring gamma rays scattered by said formations, a second gamma ray detector spaced a fixed distance from said source, at which distance from said second gamma ray detector to said source said second detector is affected by variations in the density of the surrounding material in the same sense as said first gamma ray detector, shielding substantially opaque to gamma rays disposed about said source and said detectors, a first window substantially transparent to gamma rays formed in said shielding adjacent said source, a second window substantially transparent to gamma rays formed in said shielding adjacent said first detector, said windows being located adjacent said one side of said housing, and means for differentially combining the outputs of said first and second detectors.

4. Apparatus for measuring the density of formations surrounding a well including a subsurface instrument, a recording device, and a cable suspending said instrument in the well and having conductor means for transmitting signals from said instrument to said recording device, said instrument comprising a housing, means for urging one side of said housing into contact with the wall of said well, a source of gamma rays located within said housing for irradiating said formations, a first detector spaced a predetermined distance from said source for measuring gamma rays scattered by said formations, a second detector spaced from said source a distance substantially the same distance as said first detector, gamma ray shielding substantially opaque to gamma rays disposed about said source and detectors, a first window substantially transparent to gamma rays formed in said shielding adjacent said source, a second window substantially transparent to gamma rays formed in said shielding adjacent said first detector, said windows being located adjacent said one side of the housing, and means for differentially combining the outputs of said first and second detectors.

5. Apparatus for measuring the density of formations surrounding a well including a subsurface instrument, a recording device, and a cable suspending said instrument in the well and having conductor means for transmitting signals from said instrument to said well, said instrument comprising a housing, means for urging one side of said housing into contact with the wall of the well, a source of gamma rays for irradiating said formations, a first gamma ray detector spaced a predetermined distance from said source for preferentially measuring gamma rays scattered by said formations, a second gamma ray detector spaced from said source a distance less than that of said first detector for preferentially measuring gamma rays which have not penetrated said formations, at which distance between said second gamma ray detector and said source said second gamma ray detector is affected by variations in the density of the surrounding material in the same sense as said first gamma ray detector, shielding substantially opaque to gamma rays disposed about said source and said detectors, windows relatively transparent to gamma rays formed in said shielding adjacent said source and said detectors on the side nearest said one side of said housing, and means for differentially combining the outputs of said detectors.

6. Apparatus for measuring the density of formations surrounding a well including a subsurface instrument, a recording device, and a cable for suspending said instrument in the well and having conductor means for transmitting signals from said instrument to said recording device, said subsurface instrument comprising a housing, means for urging one side of said housing into contact with the wall of said well, a primary source of gamma rays located adjacent said one side of said housing for irradiating said formations, a first gamma ray detector spaced a predetermined distance from said primary source for preferentially measuring gamma rays scattered by said formations, a second gamma ray detector spaced a distance from said source having a predetermined relation to the spacing of said first detector for preferentially measuring gamma rays which have not penetrated said formations, at which distance between said second gamma ray detector and said primary source said second gamma ray detector is affected by variations in the density of the surrounding material in the same sense as said first gamma ray detector, an auxiliary source of gamma rays of less intensity than said primary source located between said second detector and said primary source of gamma rays, shielding disposed about said sources and said detectors, a first window substantially transparent to gamma rays formed in one side of said shielding adjacent said primary source, a second window substantially transparent to gamma rays formed in one side of said shielding adjacent said first detector, a third window substantially transparent to gamma rays formed in one side of said shielding adjacent said second detector and oriented to prevent gamma rays which have penetrated said formations from passing to said second detector, a fourth window substantially transparent to gamma rays formed in one side of said shielding adjacent said auxiliary source from passing to said first detector, said windows being located adjacent said one side of the housing, and means for differentially combining the outputs of said detectors.

7. Apparatus for measuring the density of formations surrounding a well including a subsurface instrument, a recording device, and a cable suspending said instrument in the well and having conductor means for transmitting signals from said instrument to said recording device, said instrument comprising a housing, means for urging one side of said housing into contact with the wall of the well, a source of gamma rays located within said housing, a pair of substantially identical gamma ray detectors spaced substantially equal distances from said source, shielding substantially opaque to gamma rays disposed about said source and said detectors, windows substantially transparent to gamma rays formed in said shielding adjacent said source and each of said detectors and located adjacent said one side of the housing, the window adjacent said second detector being oriented to prevent gamma rays which have penetrated said formations from passing to said second detector, and means for differentially combining the outputs of said detectors.

8. Apparatus for well logging comprising a subsurface instrument having a directionally limited sensitive area, a first radiation detector for measuring characteristics of earth formations adjacent said area, means for urging said area into engagement with the wall of the well to be logged, a source of gamma radiation, a second radiation detector spaced a predetermined distance from said source within the range of gamma rays therefrom scattered by the surroundings, and means causing said second detector to be preferentially sensitive to those of said scattered gamma rays which vary in rate of occurrence in accordance with the separation of said area from the wall of the well to provide a sensible indication of said separation.

9. Apparatus for well logging comprising a housing, means for urging one side of said housing into contact with the wall of the well, a source of gamma rays for irradiating the formations surrounding the well, a first gamma ray detector spaced a predetermined distance from said source, means causing said first detector to preferentially measure gamma rays scattered by said formations, a second gamma ray detector spaced a predetermined distance from said source, and means causing said second detector to be preferentially sensitive to separation of said one side of said housing from the wall of the well.

10. Apparatus for well logging comprising a subsurface instrument having a sensitive area, a radiation detector for measuring characteristics of earth formations adjacent said area, means for urging said area into engagement with the wall of the well to be logged, and means sensitive to separation of said area from the wall of the well to provide a sensible indication of said separation.

References Cited in the file of this patent
UNITED STATES PATENTS

| | | |
|---|---|---|
| 2,469,461 | Russell | May 10, 1949 |
| 2,648,778 | Silverman et al. | Aug. 11, 1953 |
| 2,648,780 | Herzog | Aug. 11, 1953 |
| 2,667,583 | Herzog | Jan. 26, 1954 |
| 2,710,925 | McKay | June 14, 1955 |
| 2,761,977 | McKay | Sept. 4, 1956 |
| 2,769,918 | Tittle | Nov. 6, 1956 |
| 2,785,314 | Grahame | Mar. 12, 1957 |

UNITED STATES PATENT OFFICE
CERTIFICATE OF CORRECTION

Patent No. 3,038,075　　　　　　　　　　　　　　　　June 5, 1962

Arthur H. Youmans

It is hereby certified that error appears in the above numbered patent requiring correction and that the said Letters Patent should read as corrected below.

Column 5, line 26, for "scatered" read -- scattered --; column 6, line 62, after "source" insert -- and oriented to prevent gamma rays from said auxiliary source --.

Signed and sealed this 25th day of September 1962.

(SEAL)
Attest:

ERNEST W. SWIDER　　　　　　　　　　　　　　　　DAVID L. LADD
Attesting Officer　　　　　　　　　　　　　　　　Commissioner of Patents